United States Patent
Herrington

(10) Patent No.: US 7,550,102 B2
(45) Date of Patent: *Jun. 23, 2009

(54) METHOD FOR PRODUCING A HELICALLY SHAPED, SEAMLESS MULTI-WALLED CYLINDRICAL ARTICLE

(75) Inventor: F. John Herrington, Bloomfield, NY (US)

(73) Assignee: Proteus, Inc., Bloomfield, NY (US)

(*) Notice: Subject to any disclaimer, the term of this patent is extended or adjusted under 35 U.S.C. 154(b) by 399 days.

This patent is subject to a terminal disclaimer.

(21) Appl. No.: 10/485,341

(22) PCT Filed: Aug. 1, 2002

(86) PCT No.: PCT/US02/24437

§ 371 (c)(1),
(2), (4) Date: Jan. 30, 2004

(87) PCT Pub. No.: WO03/013826

PCT Pub. Date: Feb. 20, 2003

(65) Prior Publication Data

US 2004/0187946 A1    Sep. 30, 2004

Related U.S. Application Data

(60) Provisional application No. 60/309,494, filed on Aug. 3, 2001.

(51) Int. Cl.
  *D01D 10/00*  (2006.01)
  *D01D 5/24*   (2006.01)
  *B28B 11/08*  (2006.01)

(52) U.S. Cl. .............. 264/171.29; 264/563; 264/564; 264/565; 264/566; 264/568; 264/141; 264/142; 264/171.26; 264/173.15; 264/209.2; 264/209.3; 264/210.2; 264/280; 425/320; 425/391

(58) Field of Classification Search .............. None
See application file for complete search history.

(56) References Cited

U.S. PATENT DOCUMENTS

| 2,519,375 A | * | 8/1950 | Jargstorff et al. ............ 264/558 |
| 3,379,221 A | | 4/1968 | Harry et al. |
| 3,464,450 A | | 9/1969 | Steffenini |

(Continued)

FOREIGN PATENT DOCUMENTS

DE    3927569    2/1991

(Continued)

*Primary Examiner*—Monica A Huson
*Assistant Examiner*—Jeffrey Wollschlager
(74) *Attorney, Agent, or Firm*—Michael G. Gilman

(57) ABSTRACT

A method of making a composite tubular article made up of at least two concentric members, the outer of said members being tubular and the inner of said members being at least cylindrical and preferably tubular, and struts disposed in supporting and positioning orientation between the inner and outer members, by extruding a moldable material into the desired profile; stretching the inner tubular member over a cooling mandrel and disposing a cooling sleeve over the outer tubular member under conditions sufficient to solidify the article; twisting and longitudinally pulling the solidified article, so that it rotates over the cooling mandrel and inside the cooling sleeve while it is moving down stream across the cooling mandrel, whereby causing the extrudate to be twisted into a helical shape.

17 Claims, 8 Drawing Sheets

U.S. PATENT DOCUMENTS

| | | | | |
|---|---|---|---|---|
| 3,562,879 | A | * | 2/1971 | Cremer et al. .............. 425/380 |
| 3,926,223 | A | | 12/1975 | Petzetakis |
| 4,050,721 | A | * | 9/1977 | Streit .......................... 285/93 |
| 4,790,970 | A | * | 12/1988 | Kurth et al. ................. 264/130 |
| 4,808,098 | A | * | 2/1989 | Chan et al. ................. 425/72.1 |
| 5,186,878 | A | * | 2/1993 | Lupke .................... 264/209.4 |
| 6,214,283 | B1 | * | 4/2001 | Visscher et al. ............ 264/558 |
| 6,955,780 | B2 | * | 10/2005 | Herrington .................. 264/142 |

FOREIGN PATENT DOCUMENTS

| | | |
|---|---|---|
| DE | 3939714 | 6/1991 |
| EP | 0781642 A1 | 7/1977 |
| GB | 1000809 | 8/1965 |
| GB | 1432291 | 4/1976 |
| WO | WO 91/11012 | 7/1991 |
| WO | WO 00/09317 | 2/2000 |

* cited by examiner

METHOD FOR PRODUCING A HELICALLY SHAPED, SEAMLESS MULTI-WALLED CYLINDRICAL ARTICLE

This is a national stage application under 35 U.S.C. 371 of PCT/US 2002/24437, filed on Aug. 1, 2002, which claims the benefit of Provisional Application No. 60/309,494 filed on Aug. 3, 2001.

BACKGROUND OF THE INVENTION

This invention is related to a method of making certain kinds of tubing. It more specifically refers to a method of making a multiple walled tube, especially a two concentric walled tube with the two walls being radially spaced apart and having rib members in supporting relationship between and attached to the walls. The rib members of the composite tubular structure of this invention have been referred to as ribs, webs, struts and other identifying names. All of these members are intended to be included in this invention regardless of the name by which they are called. For ease of description and understanding, this invention will be described in relation to a two concentric walled tube. It will be understood that tubes with more than two concentric walls are adapted to be made according to this invention. Further, although the instant description generally refers to hollow, multi-walled tubes, it should be clear that multi-wall tubes with a solid inner element can be made according to this invention. Still further, it should be clear that the manufacturing method and apparatus described herein could be used to make a multi-walled, hollow core tube with an armature residing in the hollow inner tube. The armature can be rigid or flexible and may be made of a different material than the multi-walled tube. It can be wholly or partially in contact with the interior wall of the inner tube.

Core members are widely used in the plastic film industry as well as in the carpet and other textile fabric industries. Rolls of material are wound around suitable cores for shipping and as a convenient form for the material rolled thereon to be used as feed to downstream operations for processing the material rolled onto the core. It is common for these large rolls of material to be wound quite tightly because if the volume of the rolled material is minimized, shipping costs are also minimized. It is also a fact that as material is wound on a core, it is under at least some tension. Therefore, when the roll is completed, the rolled material tends to collapse upon itself thereby exerting more or less crushing force against the core. In addition, shrink or stretch wrap film is also conventionally wound on cores. This type of film was made with at least a unidirectional stretching operation and it therefore has a strong tendency to shrink, that is, the film has a memory wherefore its length (and sometimes its width as well) always tries to shorten itself. This tendency causes an even greater crushing stress on the core around which the shrink wrap film is wound.

It has been conventional to use disposable cardboard core members. However, it has been found that, although cardboard is very inexpensive and that is a very strong recommendation for its use, it does not have a crushing strength that is sufficient for it to withstand higher inwardly directed forces that are inherent in some wound materials, especially wound plastic film.

In order to rectify this situation, the industry has used metal (hollow or solid), wooden and/or solid plastic cores. Some thought has been given to using hollow plastic cores but it has been found that the cores must be exceptionally thick so as to be able to withstand the inwardly directed radial pressure that the wound material exerts on the core. Therefore, so much plastic must be used to make a core of the desired crush resistance, that it is uneconomical.

In the prior art, core elements have been used that consist of a solid material, such as in the form of a solid cylinder. Alternatively, cores are known that are in the form of a hollow cylinder having a single, relatively thick wall. Cores of this configuration, for example made of metal or plastic materials, can have excellent crushing strengths. The disadvantage of such cores is that they are generally quite expensive. If the user returned the cores after use, the initial expense of purchasing the cores would not be such a detriment because the shipper/seller could then reuse the returned cores. The cost of the cores would then be amortized across multiple uses rather than a single disposable use. However, users have not generally returned the used cores. The manufacturer can only amortize the cost of the core against a single use and thus must add the cost of the cores into his selling price of the material that is wound about the core. This substantially increases the price at which the wound material must be sold whereby making it less competitive. All in all, these prior art plastic cores have not met with any substantial degree of success and there is need for improvement in this technology.

Recently, a modified tubular core structure has been invented that has sufficient crushing strength to be useful in industrial applications, and employs little enough material to be economically viable. This tubular core is sufficiently inexpensive so that it does not add a significant amount to the cost of the material wound on the core wherefore it does not have to be returned to the seller. This core material is made up of concentric tubular members (preferably 2) with rib members disposed there between and in supporting relationship to both tubular members. The interior element of this core structure can be solid or hollow. Tubes with more than two concentric elements are contemplated.

Other uses have been found for this novel tubular structure in an internally hollow configuration. These structures find application in many industries such as: agriculture, construction, irrigation, water and sewer distribution, telecommunications and other electrical conduit markets. While smaller diameter multi-walled tubes have use as winding core elements, larger diameter multi-walled, hollow, tubular structures are useful in drain pipe and culvert applications. A further aspect of this invention, then is the manufacture of larger diameter, multi-walled, hollow, composite structures that are both relatively light in weight and strong in flex and crush strengths.

It is interesting to note that the material from which the tubular structure of this invention is made can be varied depending on the use to which the structure is to be put. For use as a core upon which sheet-like materials are to be wrapped, the composite tubular member should be relatively stiff and not either flexible or crushable. For culvert applications, the tubular structure should have excellent crushing strength but also may have sufficient longitudinal flexibility to be able to be bent around structures that are encountered in the ground, such as large boulders. For drain pipe and septic system applications, the tubular structure can be quite flexible, although generally, the flexibility of the pipes of the instant invention is somewhat less than conventional corrugated pipe. Further, for drain pipe and septic field applications, the structures of this invention can be perforated. The multi-walled tubular product of this invention has unique application in its perforated form. Ground water draining through the outer wall will be directed into channels (preferably helical channels, that exist between the inner and outer walls and then will drain to the end of the tube without necessarily penetrating through the inner wall and into the interior hollow structure. This structure enables the inner tubular element to be solid and therefore much more supportable. Of course, it is considered to be an embodiment of this invention to utilize the products made by the manufacturing process and apparatus of this invention as drain pipes with perforations through both the inner and the outer tubes.

This tubular structure to which this invention is directed comprises a plurality of elongated tubes, preferably of extrudable material such as plastic (e.g. polystyrene, polyethylene or the like) or aluminum or other metals. The tube is made up of multiple concentric tubular members that are radially spaced from each other. It is anticipated that the concentric tubes will be coextruded.

At least one, but preferably a plurality, of radially directed rib(s) is disposed between and in supporting relationship to the concentric tubular members. The rib(s) serves to maintain the relative radial positions of the concentric tubular members, and to provide substantial crushing resistance without adding significant amount of extra material. In many applications, the rib will be substantially normal to the tangent to the interior and exterior tubular members. Although struts that are disposed normal to the surfaces of the concentric tubes are suited to this use, it has been found that even greater strength increase and weight minimization are achievable if the ribs are disposed at an angle, other than right, with respect to the tangents of the interior and exterior tubular elements so as to form generally triangular rib members.

Next adjacent ones of these angularly disposed supporting rib elements are suitably in contact with each other at one end thereof. Thus, the two ends of at least some, but preferably all, of the angularly disposed supporting rib members are in supporting contact with the outside surface of the inner tube, and the inside surface of the outer tube, respectively. At, or very near, the line along which the angular supporting rib member is in contact with either the inner or the outer tube, each angular supporting member is also preferably in contact with the next adjacent angularly disposed supporting rib member. Thus, if the two adjacent angularly disposed supporting rib members are in contact with each other, they, together with the tubular wall that is opposite to their contact point, form a generally triangular cross section longitudinal rib member.

If the next adjacent angularly disposed supporting rib members are spaced a small distance apart at the location where they contact the respective outer and inner walls of the concentric tubular members, respectively, the assembly of two next adjacent support members and two opposite segments of the concentric tubular wall elements form a truss assembly that has a cell or cavity that is generally trapezoidal in cross section. It has been found that if the length of the shorter wall segment of one of the tubular elements is relatively short, for some unexplained reason, composite tubes with rib members having such a trapezoidal cross section are stronger than the those with triangularly shaped rib members. In either case, it is preferred, but not absolutely required, that the rib members extend the entire length of the tubular article. These rib members should preferably have a circumferential as well as a longitudinal component to their direction.

It has also been found preferable to dispose a plurality of rib members about (preferably evenly about) the entire cylindrical space between the inner and outer tubular members. Suitably, the disposition of the rib members should be symmetric about the outer and inner, respectively, circumferences of the tubular members. It has been found to be most preferred to have a plurality of rib members disposed throughout the entire cylindrical space between the inner and the outer tubular members with each adjacent rib member sharing a wall with its next adjacent rib member.

In the preferred embodiment of this structure, the rib members are disposed in a longitudinally helical configuration. This structure imparts excellent crush resistance because it provides a component of stiffness that is both tangential and radial to the walls, and it also provides the lightness that is characteristics to this product. Further, in appropriate situations, and with the correctly designated construction material, the helical configuration of the rib members adds a significant amount of longitudinal and radial bending stiffness. The angle that the helix makes to the longitudinal axis of the instant product is a determinant of the amount of bending stress can be withstood (that is how radially stiff the product is).

An interestingly adjunct of this structure is the fact that the process of forming the ribs/trusses into helical configuration unexpectedly increases the degree of roundness of the final product. Thus, the formation of this helical rib configuration causes the cross section of the composite tubular product to remain substantially constant and symmetrical. That is, if the concentric tubular members each have a circular cross section, the helical configuration of the rib members tends to cause the entire article to have a circular cross section and minimizes distortion of the circular cross section into an elliptical or oblate cross section, or a cross section with hills and valleys.

It will be appreciated that making hollow tubes of this configuration on a commercial scale is a very difficult undertaking. The instant invention is directed to a particularly effective method of making these articles and apparatus suited for carrying out this method.

OBJECTS AND GENERAL STATEMENT OF THE INVENTION

It is an object of this invention to provide an efficient method of making elongated tubular articles that comprise at least two generally concentric, cylindrical members, with rib members disposed between, and in a supporting relationship to, the cylindrical members.

It is another object of this invention to provide a method of making such structures from extruded material such as plastic materials.

It is a further object of this invention to provide an improved method of making a multi-concentric walled article with rib supporting members disposed in longitudinally as well as circumferential relationship between next adjacent concentric elements.

It is a still further object of this invention to provide a multi-walled tubular structure of surprisingly improved strength characteristics as well as an improved method of making such and an improved apparatus for carrying out the improved method.

Other and additional objects will become apparent from a consideration of this entire specification, including the drawings hereof.

In accord with and fulfilling these objects, one aspect of this invention resides in a method of forming a multi-wall tubular article comprising:

feeding at least one meltable and extrudable material into at least one extruder;

melting the material(s) into flowing fluid form;

providing a plurality of radially spaced, substantially circular extrusion dies adapted to extrude a corresponding plurality of fluid form streams of molten material, with at least one stream disposed about the periphery of the extrusion die, where an outer stream is radially separated from the next most inner stream;

extruding at least two generally concentric, substantially endless cylindrical members where at least one of said members is an outer tubular member and another of the members is an inner cylindrical member;

extruding rib members, comprising angularly directed (with respect to the tangents to the surfaces of the concentric members) struts, disposed between the inwardly directed surface of the outer tubular member and the outwardly directed surface of the inner cylindrical member, and in at least partial contact with the facing surfaces of the tubular members, to form a composite structure with rib members disposed in supporting relationship between the inner cylindrical and the outer tubular members;

wherein next adjacent ribs are disposed at least proximate to each other where they contact a surface of one of the tubular members;

wherein next adjacent ribs, together with the surfaces of the tubular members in which they are in contact, form generally triangular or trapezoidal enclosures (cavities);

admitting a gas through the extruder die into the triangular or trapezoidal cross section areas of the extruded composite structure whereby causing spaces between strut members to be substantially free of extruded material;

where the inner cylindrical member is a tubular member, drawing the interior tubular member, of the substantially endless extruded composite structure, over a cooling drum, that, in addition to providing cooling to the interior surface of the composite tubular member, has openings that through which a vacuum (including a pulsed vacuum) is applied in an amount and pulse frequency sufficient to draw the inner directed surface of the inner tubular member against its surface;

wherein the surface of the cooling drum may be tapered in a downstream direction such that, as the inner tubular member cools and thereby shrinks, the diameter of the cooling drum proportionally reduces an amount sufficient to permit the shrunk tubular structure to readily move across the cooling surface of the cooling drum and an amount sufficient to maintain cooling proximity between the inwardly directed surface of the inner tubular member of the extrudate and the cooling surface of the cooling drum, and thereby cooling and solidifying the inner tubular member and at least portions of the strut members that are proximate to the inner tubular member;

moving the cooling extrudate through a sizing sleeve and independently applying a vacuum along with a cooling means, such as water mist, onto the outwardly directed surface of the outer tubular member of the extrudate under conditions sufficient to cool and solidify the external tubular member as well as at least portions of the struts that are proximate to the outer tubular member;

wherein the combination of the outer vacuum cooling means and the inner cooling drum are sufficient to cool the inner tubular member and the outer tubular member to substantially solid conditions, and sufficient to cool the struts an amount that renders them shape stable;

drawing the cooled, solidified, multi-walled tubing away from the cooling operation while simultaneously twisting the external and internal tubular members, about their longitudinal axis, whereby converting the ribs from their extruded longitudinal orientation to an orientation that has both a longitudinal as well as a circumferential orientation, preferably into a helical orientation; and if desired, cutting the thus made multi-walled composite tubing with internal struts into desired lengths.

According to this invention, the cooling drum should be made as long as practical, in order to apply sufficient cooling at a rate that will retain the integrity to the inner tubing. In order to prevent the extrudate from freezing on the cooling drum during start-up before it has progressed to a normal operating speed, the cooling drum may be disposed on a suitable longitudinally moveable carriage. In one aspect of this invention, the longitudinal carriage and the extrusion die (that is adapted to extrude concentric tubular members) are so related in size and shape that the cooling drum can be retracted into a passage through the center of the extrusion die.

This structure will allow the cooling drum to be partially withdrawn into the passage in the die, so that during start-up only the downstream portion of the drum extends beyond the die. This enables the molten extrudate to be pulled over the cooling drum and guided into the downstream processing before it has the time to solidify and freeze on the cooling drum during start up. As the operation proceeds, the cooling drum can be moved in a downstream direction, that is, extending farther downstream of the extrusion die so that cooling of the interior tube becomes sufficient to solidify the inner tubular member during lined out operation of the instant method. That is, after startup, and when the system is running at lined out speeds, sufficient cooling takes place on the cooling drum to solidify the tubular structure which is then pulled off the drum. Because the system is running at lined out speeds, even though the interior tubular member is solidified on the cooling drum, it does not stick to the drum.

Other means of starting up the line can be used as well. The important thing is that the extrudate be cooled by contact with the cooling drum at a rate such that the inner tubular member is solidified but not frozen to the cooling drum. In this regard, it should be pointed out that one of the downstream processes that the extrudate will be subjected to is a pulling and twisting operation. The twisting component of this downstream operation twists the extrudate as it emerges from the extruder die in order to instill a circumferential component to the rib members. Thus, the extrudate must be sufficiently solid as it leaves the cooling drum that the twisting operation acts through the solidified extrudate back to the exit of the extrudate from the extruder die where the extrudate is still moldable. It will be clear, therefore, that the cooling drum must either be rotatable about a longitudinal axis, or the cooled and solidified extrudate must be able to rotationally and longitudinally slide over the surface of the cooling drum.

According to a preferred aspect of this invention, the cooling drum is rotatable about its streamwise axis. It has been found that in order for the structure to provide the maximum stiffness, the rib cells should be as symmetrical as possible. It has been found to be advantageous to provide rotational capability to the inner cooling drum. This enables the operator to have much better control over the relative rotation of the inner tubular element as compared to the outer tubular element. It is considered to be within the scope of this invention to rotate the inner tubular member at a different rotational speed than its next adjacent outer tubular member to accommodate the fact that the inner tubular member has a smaller diameter than the next outer tubular member. However, adjustability of the relative rotational speeds of the tubular members is a feature of this invention and so gives the operator excellent control.

Molten resin from an extruder is fed through a very complex die, which causes the extrudate to form the cross-sectional shape of the composite tubular structure of this invention. The extrudate is cooled and sized within a cooling tank and over a mandrel by simultaneously applying cooling from both outside and inside; the inside wall is cooled and thereby solidified by an internal drum/mandrel, and the outside wall is cooled and solidified by a sizing sleeve and a cooling bath of fluid, such as a water spray.

A puller draws the multi-walled tube away from the cooling section of the instant apparatus while simultaneously twisting it about its longitudinal axis. In a preferred embodiment, the combination of pulling and twisting gives the tubular product a helical motion that causes the rib members (as well as the inner and outer tubular members) to be twisted into a helical shape. This is most desirable for several reasons. First, helical ribs provide both longitudinal and circumferential support to the plural tubular members of the product of this invention. Second, twisting the tube while it is still somewhat moldable tends to smooth out possible imperfections in the roundness of the tubular product.

It is considered to be within the scope of this invention to apply a circumferential component to the ribs in a manner other than by making them helical. The twisting motion can be reciprocating to thereby apply a sinusoidal shape to the ribs. Other shapes that will incorporate a circumferential as well as a longitudinal component to the rib members are applicable as well. Since the extrudate is always moving in a streamwise direction, it is difficult to cause the ribs to have a circumferential orientation without having a longitudinal orientation as well. The ratio of the circumferential orientation to the longitudinal orientation of the rib members determines the relative bending and crush resistance of the multiwall product of this invention. It will also determine the weight per unit of length of the product. Increased crush resistance is achieved when the angle intercepted between the longitudinal axis and a tangent to the ribs is high, however, this results in a lower resistance to longitudinal bending. Conversely, if this angle is small, there is greater longitudinal stiffness but lower crush resistance. A proper balance must be struck for each application of the instant method and product.

If desired, the final product can be cut to any desired length by a special cutter that preferably leaves no rough edges. The cut pieces can be stacked by a stacking table. Details of each of these operations are described below. It is within the scope of this invention to coil the final product if the cut lengths are long enough to warrant it. It is also within the scope of this invention to perforate one or more than one of the concentric tubular members so that the product can permit ground water to seep into the tube and be drained away or to permit liquid in the inner tube to pass through the tube walls.

BRIEF DESCRIPTION OF THE DRAWING

FIG. 8b is a side view of the puller of FIG. 8a;

FIG. 9b is a side view of the puller of FIG. 9a;

DETAILED DESCRIPTION OF THE INVENTION

Figure 1:
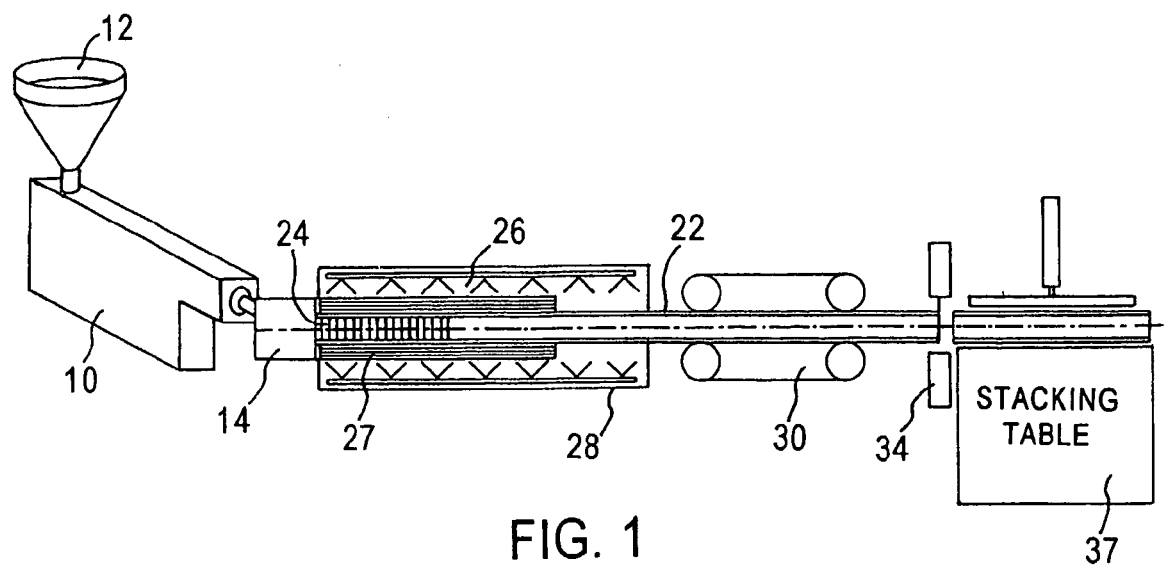
FIG. 1 is a schematic view of an operating line of the apparatus used in this invention.

Referring now to FIGS. 1, 2, 3 and 7a, an extruder 10 is fed with a suitable material, such as a plastic resin, 12. The resin is melted in the extruder and passed through an extrusion die 14 of suitable configuration to form an extrudate 22 of appropriate size and shape. The extrudate 22 is a complex structure that is made up of an inner tubular element 16, an outer tubular element 18 and a plurality of struts 20a and 20b (see FIG. 7a) that are preferably, but not necessarily, angularly disposed. The extrudate structure 22 is passed through a vacuum chamber 28 in which it is pulled over a sizing sleeve and cooling drum 24 while being passed through an external coolant, such as a water spray, 26. Upon cooling and solidification, the extrudate product 22 is then pulled away from the cooling step and longitudinally twisted by a puller/twister 30 (see FIGS. 6, 8a, 8b, 9a, 9b, 13, and 14) such that the rib members assume a configuration that has a circumferential as well as a longitudinal component, such as a helix. Note that air 32 is forced to flow between the two sets of die lips 14a and 14b (see FIG. 2) such that it enters the space between the rib members and keeps this space open and substantially free from being clogged by excess extruded plastic material. Along with being pulled and twisted, the extrudate 22 becomes fully solidified such that its rib members are in a substantially permanent shape (preferably helical). It is then cut to suitable lengths by a cutter 34 and stacked at 37. The product extrudate 22 may be coiled if it is of a long enough length.

Figure 15:
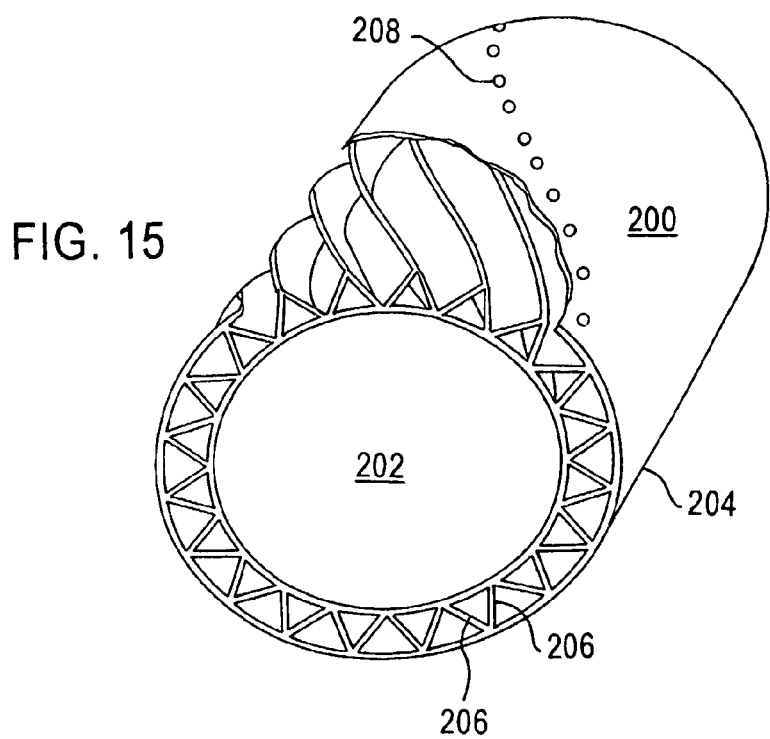
FIG. 15 is a perspective view (partially cut away) of a pipe having perforation in the outer tubular member according to this invention.
Figure 16:
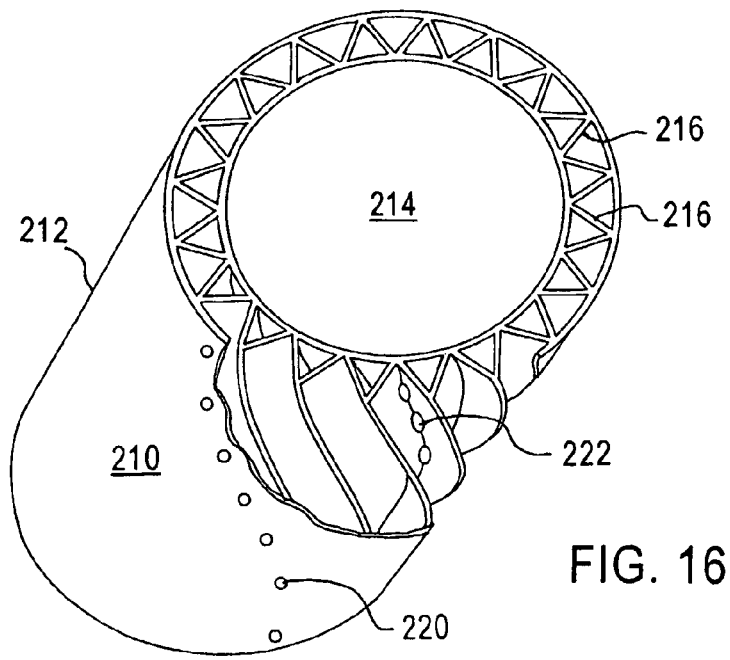
FIG. 16 is a perspective view (partially cut away) of a pipe having perforation in the inner tubular member according to this invention.

As part of the manufacturing procedure described herein, means may be provided to perforate the extrudate 22 either after it has fully solidified, or while it is still in a moldable condition. It is preferred, but not essential, that such perforations be imparted after the multi-walled tubular article of this invention has cooled to an extent that it is no longer moldable. Reference is made to FIG. 15 for a perspective view of a perforated multi-walled tubular article 150. Note that in a portion of the depicted article 150, the perforations 152 are only through the outer tubular member whereby admitting fluid to enter into the space between the several walls of the multi-walled tubular article 150 and then flow through the internal void space 35 defined by adjacent rib members and their attendant portions of the tubular member walls 20c. Perforations may also or alternatively be positioned in the inner tubular portion of the instant article. It is within the scope of this invention to provide means to join the perforations in the inner and outer tubular members and to thereby provide a passageway for fluid to pass from the inner tubular volume out of the multiwalled tube of this invention or from the volume outside the outer tubular member into the inner volume.

It should be clear that this invention is not limited to a method and apparatus of producing a multi-walled tubular product that is made up of only two tubular members. More than two concentric members can be employed. Thus, with sufficient extruder capacity feeding sufficient extrusion die(s), three or four or even more concentric tubular members can make up the final composite multi-walled tubular structure. Where more than two tubular members are being created, the space between each pair of tubular members is intended to be occupied by strut/rib elements, suitably helically shaped rib elements. Where there are more than two tubular members, the ribs between any given pair of tubular members may be formed into trusses of the shape previously described while the struts between other pairs of tubular members may be disposed substantially normal to the tangents of the surfaces of the tubular members with which they are in contact. The struts between any pair of tubular members may be aligned with the struts, or ribs, that are disposed between the next adjacent pair of tubular members, or, in the alternative, they may be disposed intermediate between the struts/ribs in the next adjacent pair of tubular members.

It is considered to be within the scope of this invention to provide, as the innermost tubular member, a solid (rather than hollow) cylinder. This solid cylinder will be connected with the next adjacent outer tubular member through suitable shaped struts and/or ribs as aforesaid. Preferably, the struts/ribs will be helically shaped. If a solid inner tubular member is employed, perforations will only be through the outer tubular member.

The particulars of this invention will be described with reference to using a single plastic material, such as polystyrene, as the material of construction. It should be understood that this is by way of example and is not considered to be a limitation on the materials that can be used to practice this invention. Any moldable material can be used, whether it is plastic or metal or glass or anything else. For ease of description, and because the nature of the individual moldable materials is not a significant limitation on the instant invention, all of these moldable materials for use in this invention will be hereinafter referred to as "resins" even though it is possible that some of the suitable moldable materials may not be plastic. It is important, however, that the possibility of using different materials for different tubular members is encompassed by this invention. If multiple resins are employed, different extruders will have to be used to feed different die lips. This technology is per se well known in the art. It is also within the scope of this invention to provide that the truss walls are the same material as one of the tubular members, but is also within this invention that the material that makes up the rib member struts is itself different from the material(s) that make up the tubular members.

A suitable plastic resin is melted and pumped by a sufficient number of conventional extruders 10, usually one extruder if there is one resin being employed, to feed moldable material, suitably thermoplastic material, to the extrusion die 14. This machine is conventional and is used universally in the plastics industry. The number of extruders that need to be employed is a function of the cross sectional size of the composite tubular product that is being made, as well as the number of different tubular members that are being made, as well as the number of different resins being extruded. It is also a function of the complexity of the cross section of the finished product. If the structure is to be composed of more than one type of resin, a separate extruder will be required for each resin material. An example of a generic extruder that is suitably used in this invention is shown in FIG. 1.

Figure 3:
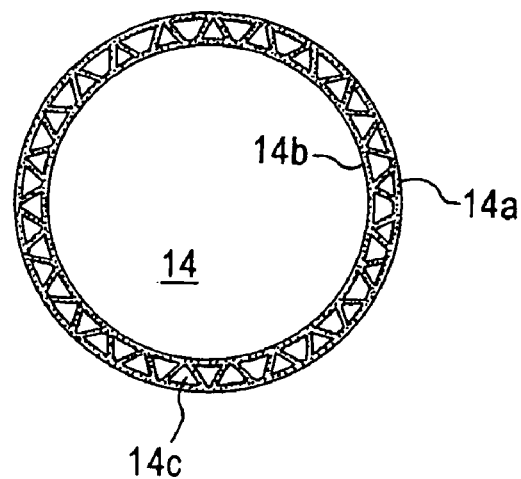
FIG. 3 is a sectional view of the opening in the exit of the die.
Figures 7A, 7B:
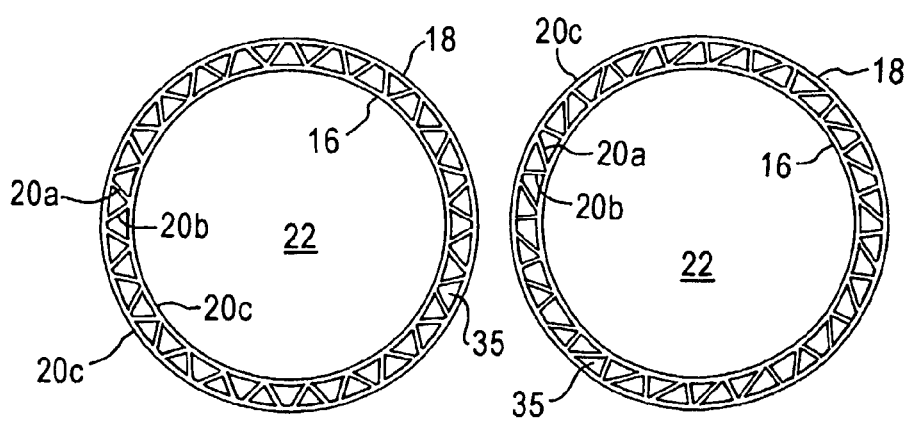
FIG. 7a is a cross section of a product embodiment of this invention showing a desired cross sectional configuration of the rib members hereof.
FIG. 7b is a cross section of a product embodiment of this invention showing an undesired cross sectional configuration of the rib members hereof that has been caused by improper rotational differentiation between the rotation applied to the inner tubular member and the outer tubular member.

The molten plastic is shaped into the desired cross section by a specialized die 14, shown in FIG. 3. A sectional view of the extrudate 22 is shown in FIG. 7a. What is shown as hatched areas in FIG. 3 is the shape of the opening in the die, with metal parts occupying the space that is not open and is shown in clear on the drawing. It should be clear that a die body surrounds a hollow outer ring 14a that is adapted to form the outer surface of the outer tubular element 18 that creates the outside circumference of the multi-walled tubular product 22. The die body is disposed within the cylindrical inner ring 14b and is adapted to form the inner surface of the inner tubular element 16. Portions of the die body are also disposed in the areas that will become open areas 14c between the struts.

Molten resin will be forced between these die body parts 13c to form the struts 20a and 20b. Additionally, molten resin will be forced between these die body parts 13c and the outer die body 13a to form the outer tubular member 18. Further, molten resin will be forced to flow between the outer surface of the inner die body part 14b and the die body parts 13c to form the inner tubular element 16. Air 32 is either forced, or simply allowed, to flow through the void space 14c between the die lips 14a and 14b, in order to make sure the molten resin that is being extruded to form the struts 20a and 20b does not flow together and block up the void spaces between the struts.

The cross section of the molten plastic as it leaves the die is shown as in FIG. 7a. It initially conforms to the shape of the die to form an inside tube 16, an outside tube 18, and multiple struts 20a and 20b. The struts 20a and b are preferably each oppositely angularly disposed with respect to tangents to the surfaces of the inner and outer tubular members 16 and 18, respectively. The struts 20a and b are joined to the inner surface of the outer tubular member 18 and to the outer surface of the inner tubular member 16 in a slightly spaced apart alignment so as to, together with the portions of the inner and outer tubular member, form oppositely directed trapezoidal ribs supporting the inner and outer tubular members.

As discussed previously, in the die cross portion shown in FIG. 2 and in the overall apparatus shown in FIG. 1, the molten resin exits to the right. A typical (conventional) extrusion die would be fed from the center at the left, for best symmetry. But in the instant invented method and apparatus for making multi-walled hollow tubular articles, it may be important to have a hole 38 through the center of the die to accommodate an internal cooling drum 24 (to be described later). Therefore in the die of this invention, the molten plastic can be made to enter the die from one or more sides.

Figure 4:
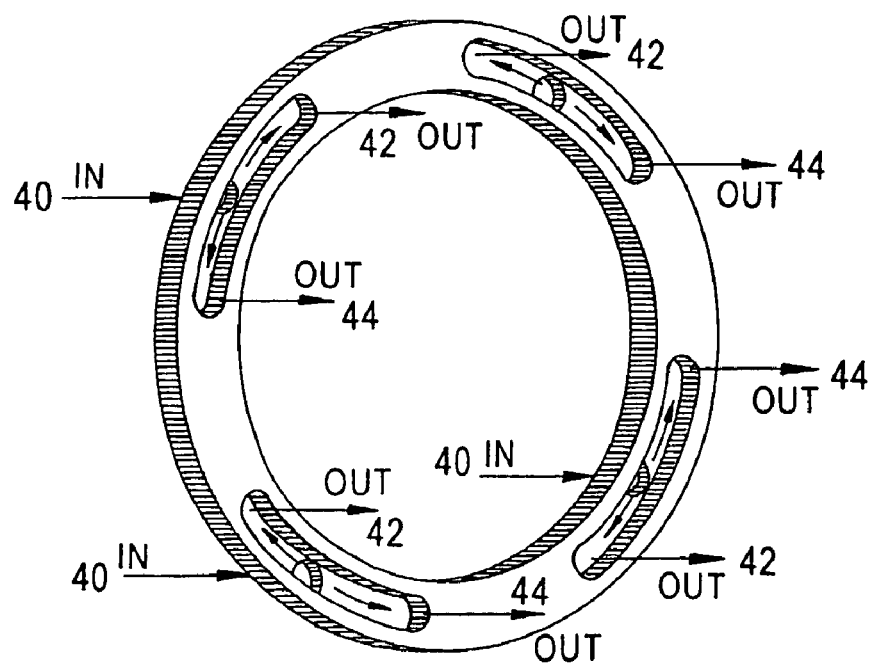
FIG. 4 is an isometric view of a resin feed distribution means.

Distribution chambers 21a, 21b, 21c and 21d, such as shown in FIG. 4, provide uniform flow of molten plastic around the periphery of the die 14. This is accomplished by dividing each inflow of molten resin 40 into two, suitably equal, parts 42 and 44, then, in a subsequent distribution chamber (not shown but that is substantially identical to the shown distribution chamber except that it has more chambers) dividing each of these streams 42 and 44 into two, suitably equal, parts, continuing in like manner forming increasing numbers of flow channels, preferably substantially identically sized and shaped, and preferably symmetrically distributed about the circumference of the extrusion die, until the channels are sufficiently close together that the flow of molten resin entering the final die orifice will be substantially uniform and will fill the entire die extrusion area with equal quantities of resin. FIG. 4 is a view looking, in an upstream direction, at a distribution ring that divides each of four (4) inlet streams 40 into a total of eight (8) outlet streams 42 and 44. In one example of the die of this invention, the diameter of the exit flow is about 3 inches, and this exit flow is fed by sixteen (16) flow channels. As can be seen in the FIG. 2, one embodiment of this invention employs the three successive plates 20a, 20b and 20c that have 2, 4, and 8 outlet (see elements 42 and 44 in FIG. 4) holes, respectively, and the main die body has 16 outlet holes, each spaced about ⅝ inch apart. Thus, this arrangement enables a single stream of resin to be divided into sixteen (16) resin streams for more uniform distribution of molten resin about the periphery of the extrusion die.

When the molten plastic first leaves the die during line start-up, it is all compressed together so there are no open cells (open areas between the struts) within the cross section. As this material moves away from the die there is no air within these spaces, so vacuum forces the molten plastic together to close up the would be void areas between the struts and the inner and outer tubular members. In order to produce open passages, it is necessary to cause air to reach the void areas between the struts as they leave the die, keep the struts apart and keep the inner and outer tubular members from slumping until the extrudate solidifies. To accomplish this, holes 32 are provided through the metal of the die into each of the open spaces between the struts. Each of these holes communicates with atmospheric air or with a suitable pump, to force air into the space between the struts and insure that the space between the struts remains open. The location of these holes 32 is shown in the sectional view of the die shown in FIG. 2.

Figure 2:
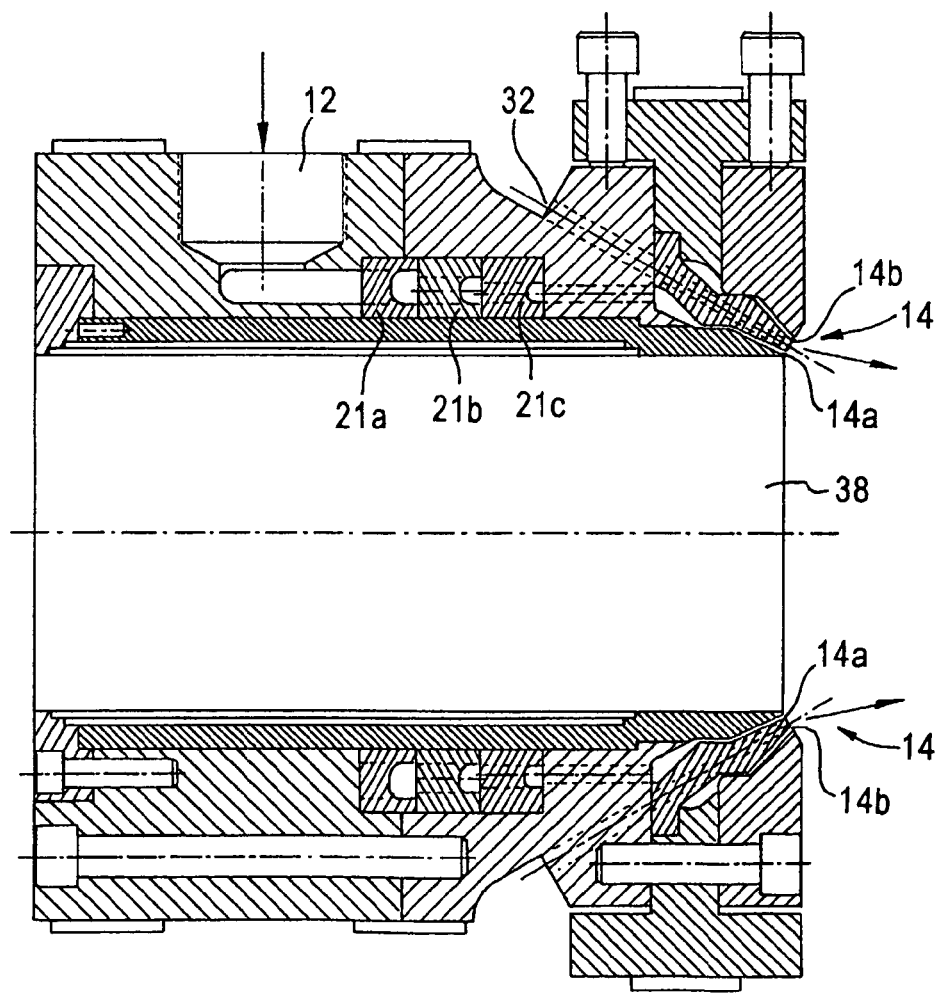
FIG. 2 is a sectional view of an extrusion die that is used according to this invention.

There is a hole 38 through the center of the die 14 that is adapted to accommodate a cooling drum (to be described later) passing there through (see FIG. 2). As a result, the molten plastic flows diagonally inward along a conical path, so that its flow distribution can take place within the structure of the die. In this way the molten resin can exit the distribution system at the smallest diameter possible within the limitations of the center hole.

The cooling of a single wall tube is conventionally accomplished in a vacuum tank, with the heat of the molten resin being removed by either spraying the surface with a water spray or immersing the hot molten resin (now in the extrudate form) in a cooling liquid, suitably water. Conventionally, the tube enters a vacuum tank, where it is cooled on its outside by sprayed or immersed water, while the tube is being drawn outwardly toward an external sizing sleeve (sometimes called a calibrator) through the use of vacuum applied through the sleeve. The cooling sleeve may be a cylindrical member with internal grooves and/or radial holes to allow vacuum to reach the hot resin tubular extrudate. Alternatively, the sleeve may consist of a series of flat rings with space between the rings to allow water spray to reach the hot tube extrudate. The sleeve may be cylindrical or slightly tapered inwardly in a downstream direction. The tube shrinks as it freezes, and if the sleeve is properly tapered it will maintain close proximity to the tube during the cooling and shrinking process. In this manner, the final tube diameter is controlled more accurately.

In producing an inner tubular member of a multi-tubular article, the diameter of inwardly directed surface of the tubular member is usually the most critical dimension, because when the multi-walled tubular article of this invention is used as a core upon which soft goods are wound, the inner surface of the inner tubular member is what interfaces with the winding equipment. With a conventional single walled tube, the internal diameter cannot be controlled directly and independently. Rather this diametral dimension is the result of two other factors, the cooled and shrunk outside diameter of the outer tubular member and the wall thickness of the tubular member.

According to this invention, after the molten multi-walled extrudate leaves the die, it is cooled from both the outside and the inside. Each wall is treated as if it was a separate thin-wall tube, and each is cooled substantially independently of the other. The ribs or struts are disposed between, and attached in supporting relationship to, the two tubular walls. These struts are cooled, and thereby solidified, by heat conduction through the tubular walls. In effect, heat from the entire structure is removed to both the inside and outside of the multi-walled tubular article, as compared to conventional profile extrusion where heat is removed only from the outside. This significantly increases the total heat removal rate, making possible a much faster extrusion line speed for a given cooling tank length. Further, this process allows independent control of both outside and inside diameters, so the critical inside diameter is controlled directly. The slack, if any, is taken up in the cooling struts, which are only indirectly cooled through the inner and outer tubular members, respectively.

The technique of cooling the outer tubular element, and its associated portion of the intermediate struts, is substantially the same cooling process and apparatus as described above for conventional extrudate cooling. In its preferred embodiment, cooling is accomplished by means of a water mist spray, and sizing is accomplished by passing the extrudate through a series of rings, each tapered slightly smaller toward the downstream end, between which a vacuum is drawn, whereby the outer tubular member is continually drawn against a decreasing diameter external sizing sleeve 27 (see FIG. 1).

The inside wall is cooled by an internal sizing and cooling drum 24. The drum is also preferably inwardly tapered in a down stream direction so that as the tubular article solidifies and contracts in diameter, the cooling drum reduces in diameter. Thus, the inner cooling drum is sufficiently smaller at its downstream end to be able to accommodate shrinkage of the solidifying resin extrudate 22 as it cools. The amount of inward taper varies depending on the type of resin that is being used. For example, a drum for cooling polystyrene may be tapered so that it is about 1% to 1.5% smaller at its downstream end than it is at its upstream end. A drum for cooling polyethylene may require a larger taper, for example about 2% to 3%, because polyethylene shrinks more than does polystyrene as it cools and solidifies. If there is too little taper, the cooling resin may shrink onto the drum and tightly grip its surface causing the whole line to jam. If the taper is too great the drum will lose contact with the hot plastic, and cooling will be less efficient.

The taper for polystyrene is critical, because once solidified, polystyrene is very stiff and it is unable to tolerate interference. Polyethylene can tolerate some interference because it can stretch to some extent and because it has a lower coefficient of friction against metal surfaces than does polystyrene. Therefore, the shrinking clearance is not so critical for polyethylene.

The inner tubular plastic element is drawn against the cooling drum by vacuum applied through the drum. This is achieved by drawing a vacuum through a series of circumferential grooves spaced at intervals along the drum length. In a preferred embodiment these grooves are about 0.060 inch wide and are spaced about 1 inch apart. It should be understood that these dimensions could be substantially altered and still be within the scope of this invention.

Because the vacuum draws the plastic relatively tightly onto the drum, the movement of the tubular product along the drum must overcome friction with the drum surface. Any sort of interruption in the line operation could cause the movement of the tubular product over the drum to hesitate for long enough for the plastic to cool more than that specific portion of the drum was designed for. The shrinkage caused by this unexpected additional cooling will increase the adherence of the tubular article to the drum to such an extent that the friction between the drum and the cooling resin article cannot be reasonably overcome without breaking the plastic tube. The amount of pulling required by this additional friction will often not overcome the friction causing a jam. To reduce this possibility, the vacuum drawn on the cooling drum is pulsed, suitably on the order of about 100 to 400 times per minute. The pulse rate could be higher or lower. Within each cycle, vacuum is applied for the majority of the time, and when it is shut off, there is a pulse of pressure applied through the drum, that forces the tubular article to be released away from the drum. Thus, the tubular article is subjected to alternating vacuum and pressure that tends to diminish the adverse effects of too rapid cooling and shrinking.

Figure 5:
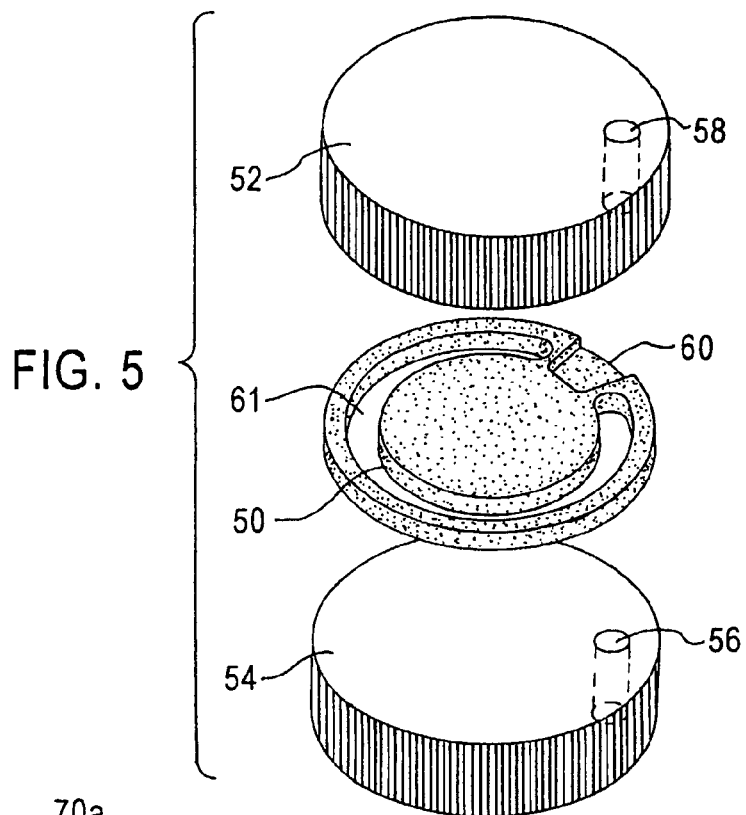
FIG. 5 is an exploded view of a pulsed vacuum cooling apparatus that is useful in this invention.

The vacuum pulsing can be accomplished by any convenient mechanism such as a rotating disk as shown in FIG. 5. The disk 50, that is sandwiched between an upper plate 52 and a lower plate 54, rotates, suitably at about 100 to 400 RPM. Vacuum is drawn through the hole 56 in the lower plate 54 while the hole 58 in the upper plate is operatively engaged with the above described grooves in the cooling drum 24. These holes 56 and 58 are positioned to be aligned and directly opposite one another. When the slot 61 is between the holes 56 and 58 in a position such that there is communication between these holes, vacuum is applied to the surface of the cooling drum (cooling mandrel) 24. During that part of the rotation when the element 60 is disposed in a blocking relationship between the holes 56 and 58, the vacuum drawn from the cooling drum is vented to the atmosphere through the upper hole 58, while the while the flow to the vacuum pump through the lower hole 56 is sealed off by the solid bottom under the element 60.

When the vacuum to the drum is interrupted, because the pressure in that hole is less than ambient, there is a sudden rush of air drawn into the upper hole 58. The inertia of that rushing air momentarily exerts outward pressure on the inwardly directed surface of the inner tubular member through the vacuum grooves in the drum, thus relieving the effect of the vacuum.

As the multi-walled tube 22 is drawn away from the die 14 and through the cooling mechanism, it is pulled downstream and simultaneously rotated or reciprocated about a longitudinal axis, so that the tube moves along a helical path or serpentine path. The longitudinal pull is exerted directly on the outside wall of the tubular article by the puller 70 (shown in FIGS. 6, 8, 9, 13 and 14), so that the tubular article 22 moves in a helical or reciprocating path that is prescribed by the combination of the rotational and longitudinal forces being exerted on the tube 22 by the puller. The outside wall 18 is driven by the puller 70, which in turn pulls the inside wall 16 through the ribs 20a and 20b, so the path of the inside wall 16 can vary depending on other factors such the direction of the frictional pull that the drum exerts on the inside wall 16. If the inside wall 16 does not follow the same path as the outside wall 18, the result is a distortion of the cells between the ribs, as can be seen in FIG. 7b. To encourage the inside wall 16 to follow the desired rotational angular path, at least a portion of the internal cooling drum 16 can be knurled to correspond to the desired helical angle, making a "path" for the inside wall to follow thereby making it easier for the inside wall to follow the prescribed angle. In effect miniature tracks are provided to guide the direction of travel of the inside wall 16.

The desired angle between the ribs and the outer surface of the inner tubular element is not the same as the angle between the ribs and the inside surface of the outer tubular element. As an example, if the angle between the ribs and the inner surface of the outer wall is 45°, for each rotation of the tube, a spot on the helix must advance longitudinally a distance equal to the outside circumference of the outer wall 18. Therefore, at this rib angle, a given point moves circumferentially the same distance as it moves longitudinally. The inside must also advance longitudinally that same distance. However, for the same intercepted angle of rotation, the spot on the inner tubular member moves circumferentially a smaller distance because of the circumference of the inner tubular member is smaller. This results in a different angle between the ribs and the outer surface of the inner tubular element 16 than the angle between the ribs and the inner surface of the outer tubular member 18.

In practice, even with the knurled internal cooling drum 24, it is sometimes not possible to achieve cells that are totally uniform. As a means of controlling this circumstance as the line is running, means may be provided to rotate the internal cooling drum 24 slowly in one direction or the other as needed to regularize the cells. For example, if the distortion is as shown in FIG. 7b, the internal drum would be rotated clockwise to correct the distortion. If the distortion is in the other direction, the drum will be rotated counterclockwise to correct the situation.

Line speed is limited by the speed at which heat can be removed from the multi-walled tubular extrudate 22. This heat removal, in turn, is related to the length of the extrudate that is being cooled. The length of the outer tube 18 that is being cooled at any given time can readily be increased by providing a longer vacuum cooling enclosure 28. Increasing the length of the inside cooling mechanism is more complex and much more difficult.

When starting up the line, the molten plastic extrudate 22 is manually pulled away from the die and stretched over the cooling drum 24. Once the cooled multi-walled tube advances past the end of the internal cooling drum, it is attached to a startup tube that pulls it through the remainder of the line. As the internal cooling drum length is increased, it becomes more difficult to thread up the line because the plastic freezes onto the drum before it can be pulled past the end. This effectively limits the maximum drum length. However, a longer drum would be very desirable because it would permit higher cooling rates. One way to overcome this problem according to this invention is by providing means to move the inner cooling drum longitudinally. One such means calls for mounting the drum on a longitudinally moveable carriage that allows it to be moved longitudinally upstream toward the plane of the extrusion die, and even further upstream through a hole in the center of the die.

During start-up, a given length of internal cooling drum is permitted to extend downstream past the end of the die effectively shortening the internal cooling drum. Once the line is up and running, the drum is advanced streamwise as the line is speeded up effectively lengthening the internal cooling drum. This is a very important improvement that has been accomplished by this invention.

As with a conventional profile extrusion process, the product is drawn away from the die by a puller. However, the function of the puller of this invention differs from that of a conventional puller 70 in two ways:

first, it rotates the tube as it pulls the tube longitudinally. This is what produces the desired configuration of the ribs having a longitudinal as well as circumferential component; and second, it exerts a uniform radial squeeze around the tube, forcing the tube inwardly in a uniform manner and maintaining the tube at an acceptable degree of roundness.

Figure 6:
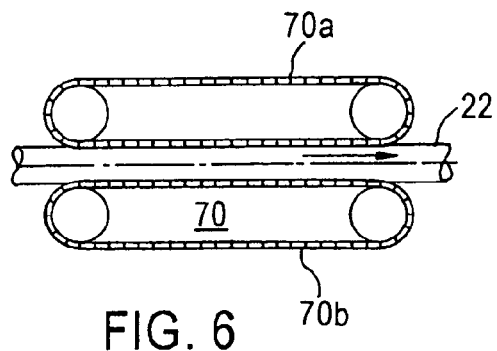
FIG. 6 is a side view of a conventional puller apparatus that serves to pull extrudate from the cooling system.

A conventional puller, as shown in FIG. 6, drives the product straight downstream away from the die, with no rotation. The driving force is achieved by the puller belts or rollers squeezing the extrudate between 2 to 4 driven rolls or belts 70*a* and 70*b* that move the tube 22 in a downstream direction. Because of the friction on the cooling drum, that may be caused by difficulties of cooling the complex structure of the tubular extrudate of this invention, it may require more pulling force to move this product downstream than a typical single walled tubular product that is cooled from the outside only. To achieve the necessary driving force, the rolls or belts of a conventional puller 70 may have to squeeze harder, sometimes even hard enough to distort the extrudate product 22.

Figure 9A:
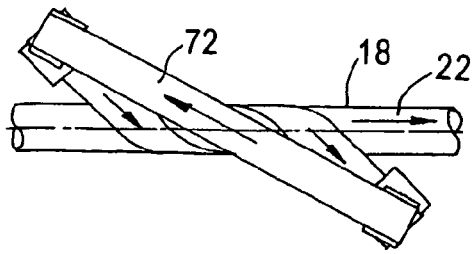
FIG. 9a is a top view of a single element puller that imposes an improved helical twist to the rib members.
Figure 9B:
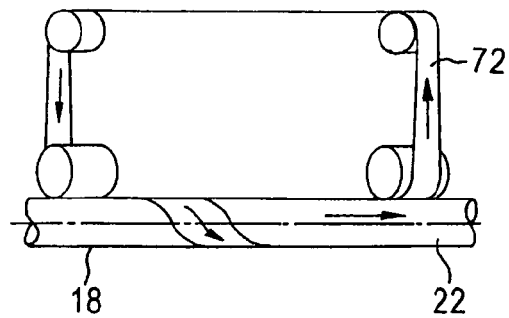

Referring to the single belt puller shown in FIGS. 9*a* and 9*b*, the puller for a multi-walled, helical-ribbed tube 22 of this invention drives the outer tubular member 18 by means of a belt 72 that is wrapped helically around the tube 22. As the belt 72 is driven, it moves the whole of the plastic tube 22 downstream while simultaneously rotating it. The inner and outer walls as well as the longitudinally straight disposed struts (ribs) 20*a* and 20*b* that have been produced by the extrusion die are then caused to form a helical path along the tube (while the tubular product is still in a moldable condition) because of the rotation of the outer and inner tubular members with respect to the die. Because the belt 72 forms one complete wrap about the tube, it exerts a direct radial force that completely encircles the tube 22, so there is no force tending to flatten or distort the tube.

Figure 8A:
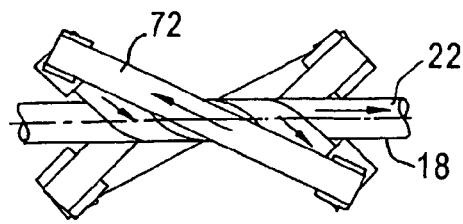
FIG. 8a is a top view of double element puller that imposes a helical twist to the rib members.
Figure 8B:
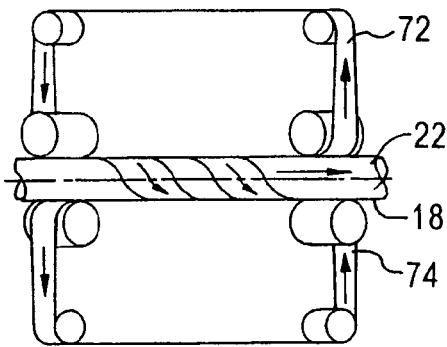

One difficulty encountered by this operation is that the tension on the belt 72 applies sideways forces 101*a* and 101*b* that tend to bend the tube 22. This problem is solved, as shown in FIGS. 8*a* and 8*b*, by applying a second belt 74 intertwined with the first belt and wrapped around the extruded tube 22. Both belts 72 and 74 exert longitudinal and rotational forces in the same direction, but each is out of phase with the other such that the sideways force that each applies to the tubular product is directly opposite to the sidewise force applied by the other. Thus the bending forces that each exerts is effectively countered by the bending forces exerted by the other. This is shown at the in FIGS. 9*a* and 9*b*.

In the pullers shown in both FIGS. 8(*a* and *b*) and 9(*a* and *b*), the depicted belt pulls the extruded tube 22 forward (that is in a downstream direction) and also twists it to convert the longitudinally extruded ribs into helical ribs. The direction of travel of the belt of the puller can relate to the direction of travel of the tube at substantially any angle that is desired. This angle is the angle intercepted by a plane that includes the axis of the tube 22 and a plane that includes the centerline of the belt 72. Actually, the centerline of the belt 72 and the axis of the tube 22 are skew lines. However, for ease of understanding, the plane containing the tube axis and the plane containing the belt centerline will be referred to as lines having an angle intercepted there between. Assuming that the speed of the belt and the speed of the tube are in a constant ratio, the angle intercepted between the centerline of the belt and the axis of the tube determines the angle of the helical rib elements with respect to the axis of the tube. It therefore also controls the pitch and "wave length" of the helical rib elements. Thus, if the intercepted angle is about 45°, the helical angle of the ribs will also be about 45°. As the angle intercepted between the axis of the tube and the centerline of the belt increases, the wave length of the helical ribs shortens whereby increasing the circumferential support provided by the ribs between the inner and outer tubular members. This increase in support comes at the expense of the amount of material in the ribs per linear length of the tube. Conversely, as the angle intercepted between the centerline of the belt and the axis of the tube is reduced, the wave length and pitch of the helical ribs increases. This reduces the amount of material that makes up the ribs of this invention per unit of length of the tube. If the orientation of the ribs is more circumferential, the crush resistance of the tubular composite is increased at the expense of the longitudinal bending resistance of the product. If the orientation of the ribs is more longitudinal, the bending stiffness is increased while the crush resistance is reduced. While it has been found to be most convenient to operate at an angle of about 45° because the design of the machinery is simpler, it is considered to be within the scope of the instant invention to operate at any angle, especially an angle that is between about 10° and 80°, most especially at an angle between about 30° and 60°.

Figure 13:
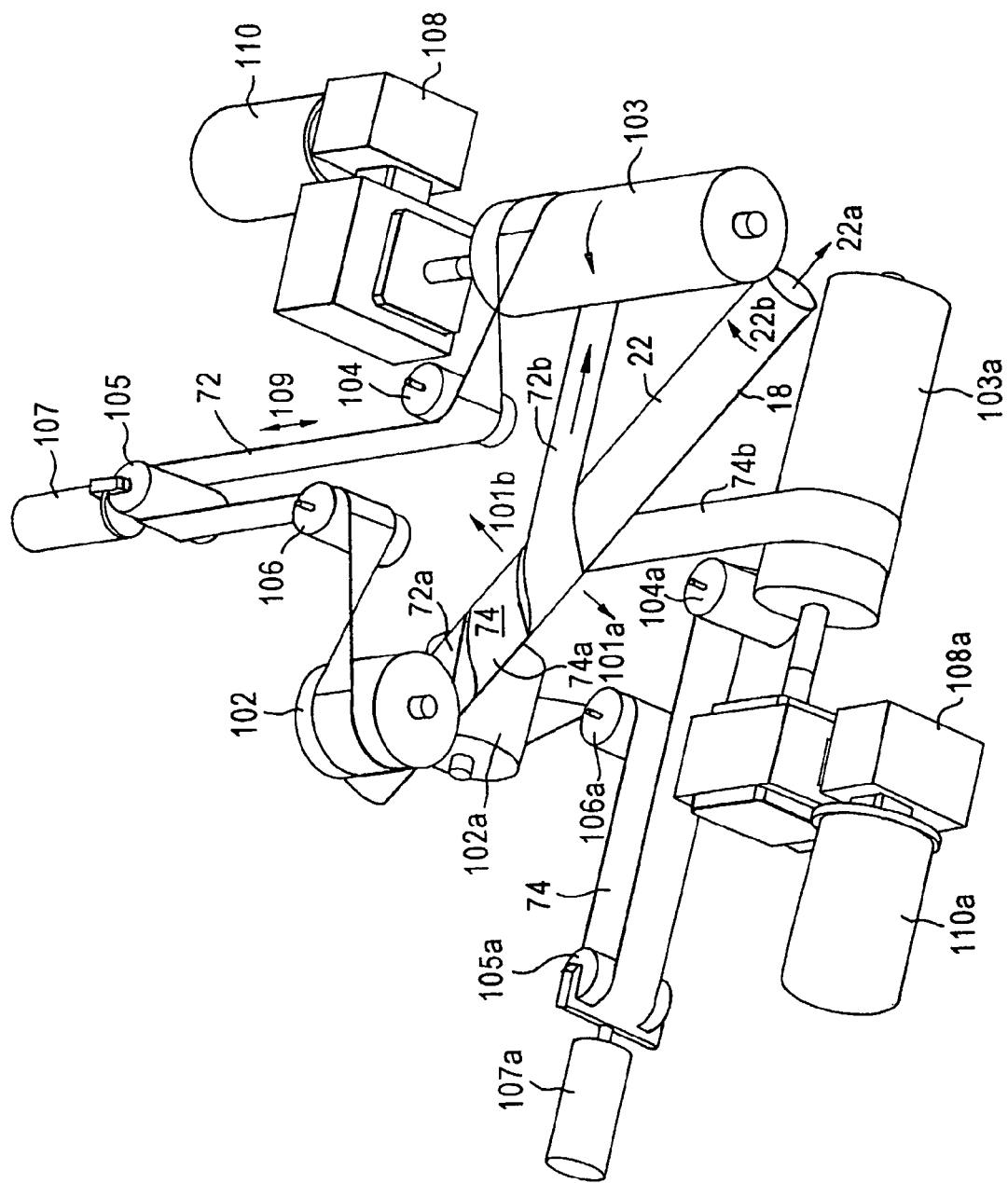
FIG. 13 is a schematic perspective view of an improved puller apparatus.
Figure 14:
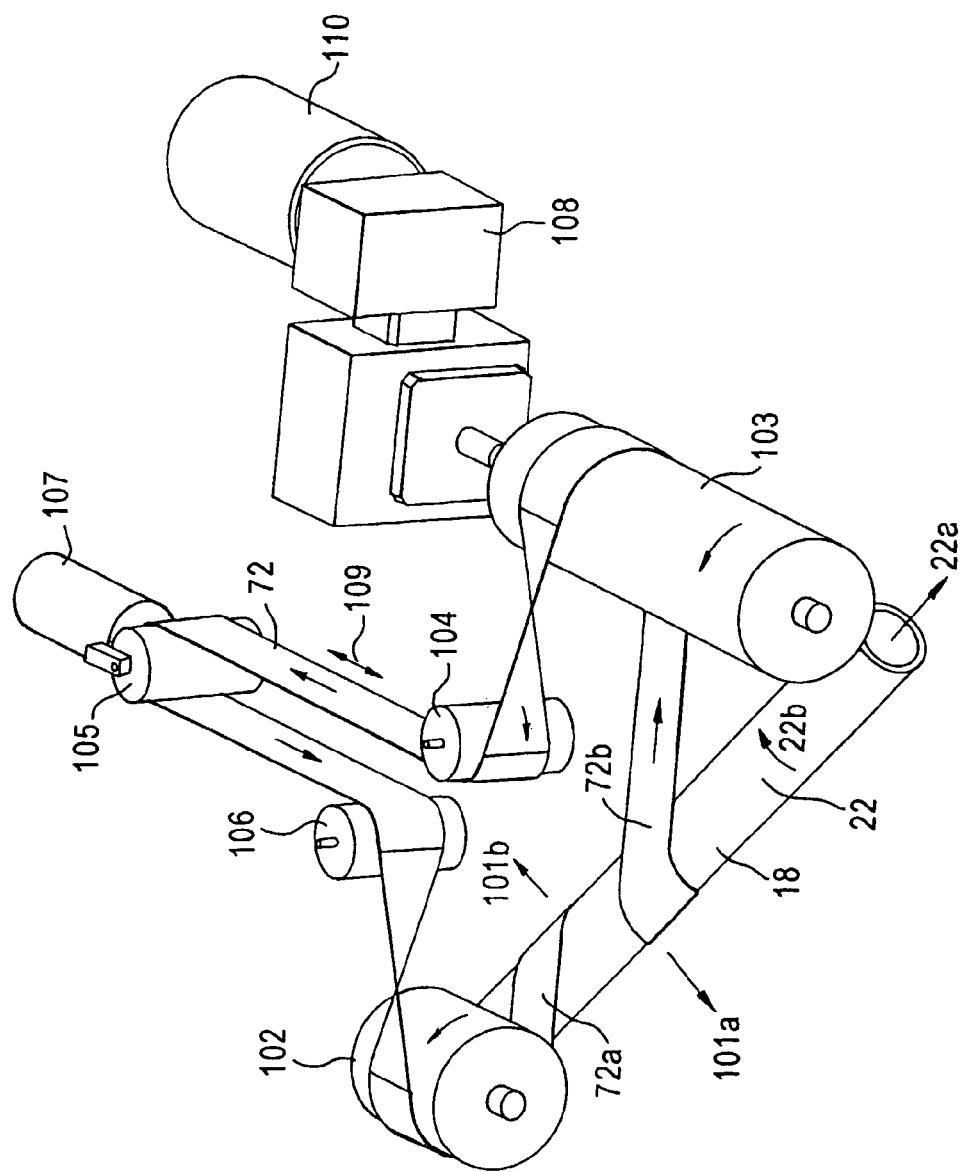
FIG. 14 is a schematic perspective view of a modified improved puller apparatus.

Referring to FIG. 13, according to this invention, an improved version of the previously described puller is set forth. The puller belt 72 first comes into contact with the extruded tube 22 at a location 72*a* that is determined by the angle of the pulley axis with the axis of the tube. It is preferred that the puller belt is led into contact with the tube surface by an idler pulley 102 at about the same location (distance from the idler pulley 106) regardless of the angle at which the centerline of the belt 72 contacts the surface of the extruded tube 22. The belt 72 is centered on the idler pulley 102 thereby assuring the proper positioning of the belt 72 on the tube 22 and the proper angle of attack of the belt 72 with regard to the axis of the tube 22. It will be apparent that the angle intercepted between the axis of the pulley 102 and the axis of the tube 22 will be complimentary to the angle intercepted between the angle of the tube axis and the centerline of the belt. With this mathematical relationship, it should be apparent that the angle of attack of the belt 72 can be changed by rotating the pulley 102 in a plane that includes the pulley axis and is in the direction of flow of the tube 22.

The belt 72 is fed to the pulley 102 from a fixed idler pulley 106 whose axis is preferably disposed normal to the axis of the pulley 102. This relationship of these two pulley rolls is effective to twist the belt 72 a full 90° from its position as it comes off. The spatial relationship and orientation of the idler pulleys to each other is a function of the space available in which to position these elements. As will be seen below, positioning the idler pulleys 106 and 104 at right angles relative to the positions of the idler pulley 102 and the driven pulley 103, respectively, is one important aspect of this invention. In the device depicted in FIG. 13, which shows a single belt puller system, the pulleys 102, 104 and 106 are preferably idler pulleys (that is they are neither independently driven nor do they drive the belt). The pulley 103 is the driven pulley.

The place where the belt 72 leaves the tube 72*b* can vary depending on the tube diameter, and on the degree of lateral force that needs to be applied to the belt by the tube. After leaving the tube, the belt enters the long driven roll 103 with its centerline substantially perpendicular to the axis of the driven roll 103. The drive roll is driven by a conventional motor and, if desirable or necessary, a speed reducer (reducing gear) 108. As the belt comes off the driven roll 103, it turns 90° and then is passed around an idler pulley 104. The angle of the axis of the idler pulley 104 is normal to the axis of the driven roll 103 so as to enable it to turn the belt 72 through 90° and thereby align it with the orientation of the belt as it passes over the previously mentioned idler roller 106.

In the alternative, especially where it is contemplated that there will be changes in the diameter of the tube 22, it is considered to be within the scope of this invention to make the pulley 106 a driven pulley and the pulley 103 an idler pulley. In addition, it has been found to be expedient to position the driven pulley 106 as close to the tube 22 as is practical. In this configuration, the unsupported length of the puller belt 72 is made as short as practical and it can be maintained at that separation regardless of any change in the diameter of the tube 22. It is contemplated that either arrangement will be appropriate in the apparatus of this invention.

One of the important aspects of this part of this invention, especially where the helical angle of the ribs is 45°, is the employment of a means to maintain the effective length of the belt the same regardless of small variations in the diameter of the tube 22 that is being pulled/twisted. This is accomplished through a combination of elements including a tensioner element 107 that acts on the belt 72 through a pulley 105. In this aspect of this invention, the idler pulley 104 is made adjustable in a direction 109 such that it can be placed in line with where the belt leaves the drive roll 103. The belt 72 twists through an angle of about 90° during its travel from the driven roller 103 to the adjustable idler pulley 104. If there are small variations in the belt position along the drive roller 103, these can be accommodated by arranging a slight compensating angle in the path from the drive roller 103 to the idler 104.

The largest variation in belt position along the driven roller 103 results from a change in the diameter of the tube 22. For example, if the axis of the product tube is oriented at an angle of 45° with respect to the center line of the belt as it leaves the surface of the tube 22, an increase of one (1) inch in the diameter of the tube results in the belt being positioned 2.2 inches differently along the drive roller. Where the diameter of the tube is changes to a substantial extent, this will be accommodated by a replacement of the puller/twister belt for one of longer or shorter length, depending on which way the tube diameter has been changed.

In a conventional profile extrusion process, where the extruded tube has not be twisted as well as pulled, the product leaving the puller is cut to length by a circular saw that is mounted to a movable table. As the product advances, a clamp on the saw table grips it, making the saw and its table move at the same speed as the product while the cut takes place. Then the clamp releases and the saw table returns to its rest position awaiting the next cut.

With the multi-walled tubular product of this invention, the conventional cutoff saw is less than completely satisfactory for the following reasons:

first, the circular saw leaves a somewhat rough cut, and produces sawdust, which is undesirable in many applications, such as cores that are used for film that is used in painting or electronics applications; and, second, the advancing product cannot be effective gripped because the product is rotating as it advances.

Figure 11:
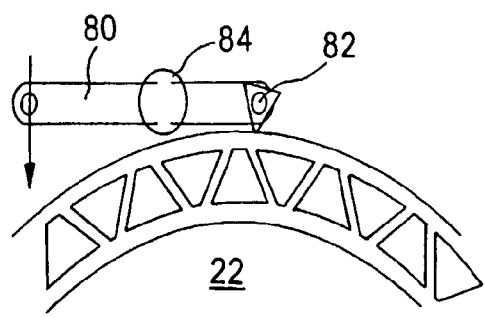
FIG. 11 is a transverse sectional view of an additional feature of an improved cutter assembly according to this invention.
Figure 10:
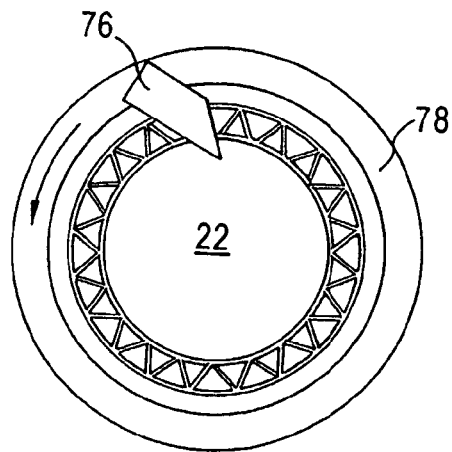
FIG. 10 is a transverse sectional view of a cutter assembly for cutting tubular assemblies of this invention into the desired lengths.

As shown in FIGS. 10 and 11, in the instant method and apparatus for producing a helical-rib multi-walled tube of this invention, the cut is made by a knife blade 76 mounted on a hollow ring 78 that spins around the tube, suitably at about 350 RPM, while the blade is plunged into the outer wall of the tube 22 as shown in FIG. 10. This makes a dust-free cut on many materials, such as high density polyethylene.

With higher-stiffness materials like polystyrene, the blade alone can produce some small cracks or chips. To avoid this, a V-shaped cut is made in, but not through, the outer wall of the tube 22 before the blade enters. The mechanism for this consists of a pivoted arm 80 with a V cutter 82 at the end away from the pivot, and a roller 84 midway along the length of the arm. The arm 80 is suitably spring-loaded (not shown) inward against a stop. When the actuating means moves toward the tube 22, the blade 82 contacts first, (shown in the FIG. 11) making a V-shaped cut/depression, when the "V" shaped depression is deep enough, the roller 84 contacts the outer wall of the tube whereby limiting the depth of the cut to less than all the way through the outer tube 22, then the arm pivots about the roller withdrawing the V cutter.

Figure 12:
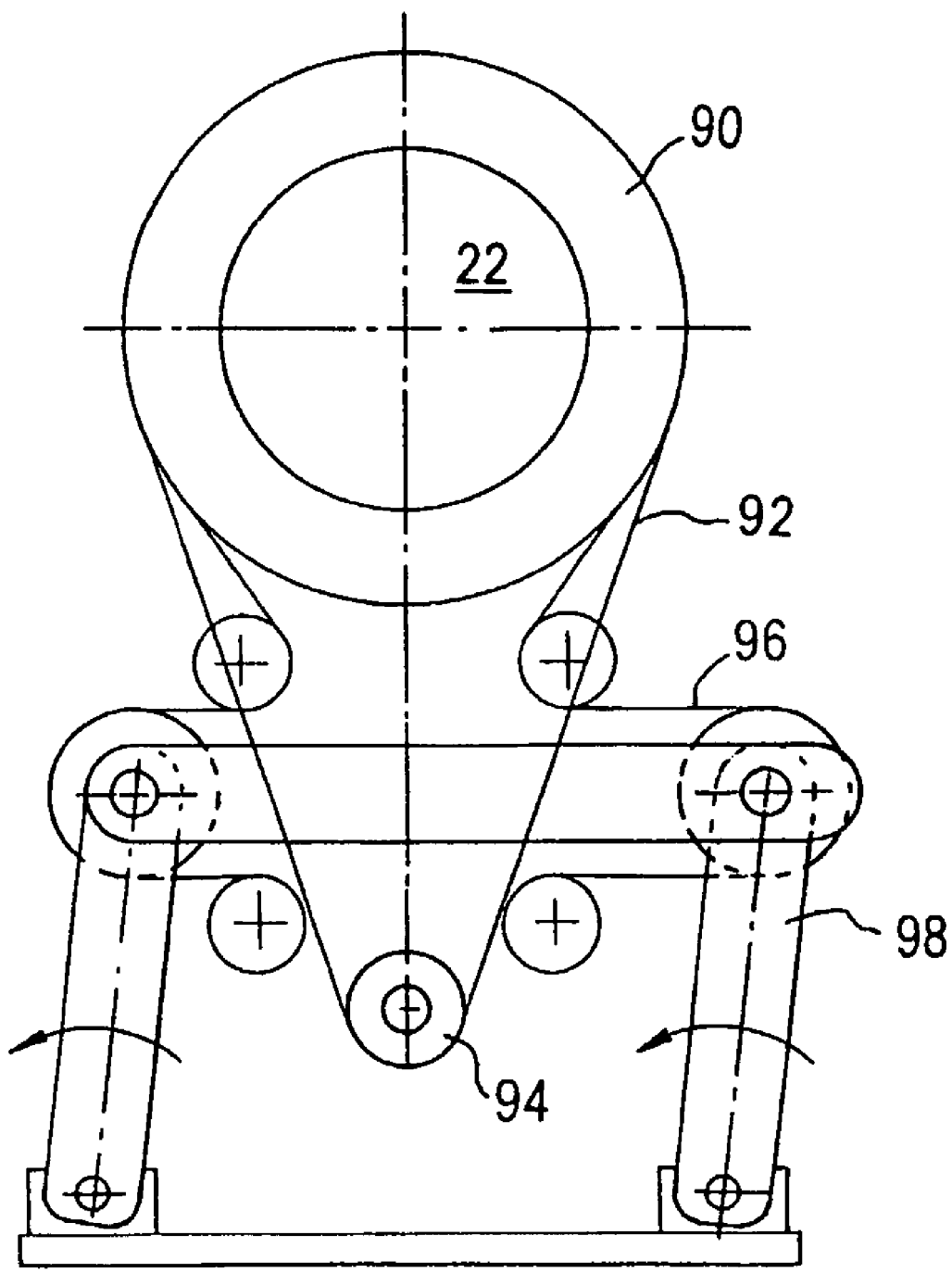
FIG. 12 is a transverse sectional view of a rotational assembly associated with the cutter assembly.

As shown in FIG. 12, the cutoff machine is on a carriage that travels with the tube 22 as the cut is being made. On a commercial production line, the multi-walled tubular product 22 rotates very slowly. This makes it necessary to spin the blade and V-cutter 76 and 82 about the product. The blade and V-cutter 76 and 82 are mounted to a spinning hollow rotor 90 through which the tubular article 22 passes. When the time arrives to make the cut, a clamp (not shown) grabs the incoming tubular product 22, causing the carriage to ride along with the moving tube. The clamp has wheels, so it allows for the slow rotation of the product that was imparted by the helical puller. Then the knife and V-cutter are plunged inward as they spin about the tube. A novel aspect of this cutter machine is a way to reach inside the rotating mechanism to actuate the blade.

The rotor 90 consists of two large hollow timing belt pulleys side by side. One of the pulleys is driven, by a belt 92, direct from the drive motor 94. The second belt 96 is longer, and makes a path about a series of idlers as it goes around a shuttle 98. As the shuttle is moved it lengthens the path of the belt 96 on one side of the pulley and shortens it on the other side, so that the second pulley changes its angular position relative to the first. The blade 76 mount is suspended between the two pulleys, so when the pulleys change angular position, the blade moves inward. In operation, the shuttle is parked at one end of its travel, and the two pulleys rotate at the same speed with the blade retracted outward. When it is time to cut, a linear actuator, such as an air cylinder (not shown) or linear actuating servo mechanism, moves the shuttle to the other end of its travel, causing the second pulley to rotate a bit slower and plunging in the blade. Then the shuttle returns to its home end, and the blade retracts, awaiting the next cut.

In its rest position, the cutter carriage is held lightly, such as by an air cylinder, in an upstream direction against a stop. As the tube exits through the cutter, it slides along a table that cradles it, holding it in line. Extending up from this cradle is a tongue that is struck by the leading edge of the tube. The tongue is attached to the carriage of the cutter, so the advancing tube pushes on the tongue, causing the carriage to travel downstream along with the tube, overcoming the upstream force of the air cylinder. When the carriage begins to travel, a sensor releases the air cylinder and begins the cutoff cycle. At the conclusion of the cycle, the tongue retracts, the air cylinder returns the carriage to its rest position, and a pusher foot pushes the cut portion of the tube sideways onto a slanted table and into a bin.

It is considered to be within the scope of this invention that the ends of cut lengths of tubular product will be formed into male and female configuration so that lengths of tubing can be joined together. These joints can be bell and spigot type joints or threaded joints or the like.

What is claimed is:

1. A method of making a substantially rigid, helically shaped, seamless, unitary, tubular structure comprising a helically shaped outer tubular member having an outwardly directed wall, a helically shaped inner tubular member having an inwardly directed wall that is radially spaced from said outer tubular member, and a plurality of helically shaped ribs disposed in an annular space between said inner and outer tubular members,
   wherein at least some of said ribs are in spacing and supporting relationship to said inner tubular member and said outer tubular member and wherein said structure as a whole and all elements thereof is a helically shaped seamless structure,
   said method comprising:
   melting a moldable material and extruding said melted material into a unitary, moldable extrudate comprising said moldable inner tubular member, said moldable outer tubular member, and a plurality of said moldable ribs,
   radially spacing said outer tubular member from said inner tubular member,
   disposing at least some next adjacent ribs and the portions of said inner tubular member and said outer tubular member intercepted by said next adjacent ribs so that together they form at least one helically shaped truss cell(s) having at least one of a trapezoidal and/or triangular cross section;
   molding said moldable extrudate into a helically shaped moldable tubular extrudate;
   moving said moldable extrudate in a downstream direction;
   applying circumferential drive to an outer surface of said extrudate such that the combination of said downstream and circumferential drives cause said extrudate to move downstream along a substantially helical path;
   simultaneously passing said helical shaped, moldable extrudate about internal and external sizing and cooling zones that provide sufficient cooling to solidify said extrudate as a helix;
   juxtaposing an inner surface of said inner tubular member with a cooling element, comprising a solid mandrel disposed within said inner tubular member for a time sufficient to cool and solidify said inner tubular member as well as a portion of said rib elements adjacent to said inner tubular member;
   substantially simultaneously passing said helically shaped, moldable extrudate through an external cooling means proximate to an outer surface of said outer tubular member;
   disposing said external cooling means and the outer surface of said outer tubular member within a cooling sleeve for a time sufficient to freeze and solidify said outer tubular member as well as a portion of said rib elements adjacent to said outer tubular member;
   causing said internal cooling mandrel and said external cooling means to be in simultaneous cooling relationship with said inner surface of said inner tubular member and said outer surface of said outer tubular member, respectively, until the helical inner tubular member, the helical outer tubular member and the helical rib elements have all solidified;
   configuring said cooling mandrel and said cooling sleeve with lengths that correspond to the time it takes for the molten helically shaped tubular article to become cool enough to be self supporting;
   passing cooling fluid through said extruder and at least some of said truss cells in an amount sufficient to enable said at least some truss cells to communicate with ambient fluid outside said extruder and to cool and solidify at least part of at least some of said rib elements;
   rotating said cooling mandrel and thereby rotating said helical inner tubular member and said helical outer tubular member relative to each other at angular velocities such that the angles said rib elements make with respect to said inner tubular member and said outer tubular member, respectively, are substantially the same when said extrudate is moldable as well as after said extrudate has been cooled and solidified; and
   carrying out said method under conditions such that the outer cross sectional diameter of said solid unitary helically shaped structure is not substantially larger than the outer cross sectional diameter of said moldable extrudate.

2. A method as claimed in claim 1 further comprising drawing a vacuum through apertures in said cooling mandrel juxtaposed an inwardly directed surface of said inner tubular member in an amount sufficient to cause an inwardly directed surface of said inner tubular member to maintain at least close proximity to a cooling surface of said mandrel.

3. A method as claimed in claim 2 further comprising intermittently releasing said vacuum whereby permitting said inwardly directed surface to move away from said cooling mandrel for a period of time that is sufficient to prevent said inwardly directed surface from adhering to said mandrel during said cooling operation.

4. A method as claimed in claim 1 further comprising pulling and twisting said solidified extrudate an amount sufficient to convert all elements of said moldable extrudate into a substantially helical configuration before it is fully solidified, and solidifying said molten extrudate in said helical configuration.

5. A method as claimed in claim 4 further comprising drawing and twisting said helically shaped solidified extrudate such that said cooling extrudate follows a helical path about said cooling mandrel, and rotating said mandrel at a sufficient speed and direction to adjust the rotational speed of said inner tubular member relative to the rotational speed of said outer tubular member such as not to permit said ribs to substantially deform prior to and during cooling.

6. A method as claimed in claim 1 further comprising passing said molten material through a complex, arcuate rotatable die assembly comprising means to form said helically shaped, seamless helical structure comprising said inner tubular element, said outer tubular element and said ribs as the moldable extrudate;
   rotating said complex die assembly while passing said moldable material there through such that the produced moldable extrudate is a unitary, seamless, helical structure having substantially the same helix angles in all of its elements.

7. A method as claimed in claim 6 further comprising feeding said moldable material to said arcuate extruder die assembly from a plurality of feed locations disposed about the periphery of said extruder die.

8. A method as claimed in claim 7 wherein said feed locations are substantially equally spaced about the periphery of said extruder die assembly.

9. A method as claimed in claim 8 further comprising:
   A. subdividing a feed of said moldable material into a plurality of first feed streams;
   B. subdividing at least some of said plurality of first feed streams into a plurality of second feed streams C. repeating step B a sufficient number of times to produce a plurality of feed streams each of which has a substantially smaller volume than said feed; and D. feeding the product of step C substantially evenly distributed about the periphery of said arcuate extrusion die assembly.

10. A method as claimed in claim 3 further comprising, during release of said vacuum, applying an overpressure of fluid through at least some of said apertures in an amount and at a velocity sufficient to cause said inwardly directed surface to move away from said mandrel.

11. A method as claimed in claim 4 further comprising:

A. feeding a moldable material through an extrusion die to form a molten unitary extrudate having a more inward tubular member, at least one radially spaced apart more outward tubular member, and a plurality of ribs, disposed at angles other than perpendicular with respect to said inward and outward tubular members and in supporting contact relationship between said more inward tubular member and a next adjacent more outwardly spaced apart tubular member;

B. causing said molten extrudate to be twisted circumferentially and to be simultaneously drawn downstream from said extrusion die into cooling relation with said cooling zone;

whereby causing said molten, twisted, drawn extrudate to traverse said cooling zone along a path that has both longitudinal and circumferential components and substantially corresponds to the degree of twisting and downstream drawing imparted to said extrudate; and C. while said tube is progressing downstream along a path having longitudinal and circumferential vectors, cutting said tube into discrete lengths.

12. A method as claimed in claim 11 further comprising forming the opposite ends of at least some of said discrete lengths of tubing into male and mating female profiles, respectively.

13. A method as claimed in claim 1 wherein said ribs are seamlessly formed with and joined to said outer tubular member and said inner tubular member, respectively, as said extrudate is being formed.

14. A method as claimed in claim 1 further comprising rotating said mandrel relative to the outer surface of said extrudate an amount sufficient to maintain said ribs in substantially the same structural relationship to said solidified outer and inner tubular members as it was prior to solidification.

15. A method as claimed in claim 1 wherein said fluid is air at a temperature that enables cooling/solidifying of said ribs.

16. A method as claimed in claim 1 wherein said fluid is adapted to be introduced through said extruder and thence into said cells in a direction that is co-current to the downstream direction of the tubular structure.

17. A method as claimed in claim 1 wherein said ambient fluid comprises air and said method further comprises providing vacuum inducing means for drawing said ambient air into a downstream end of said cells and thence through said cells and said extruder whereby enabling said ribs to be cooled and solidified from inside said cells.

* * * * *